UNITED STATES PATENT OFFICE.

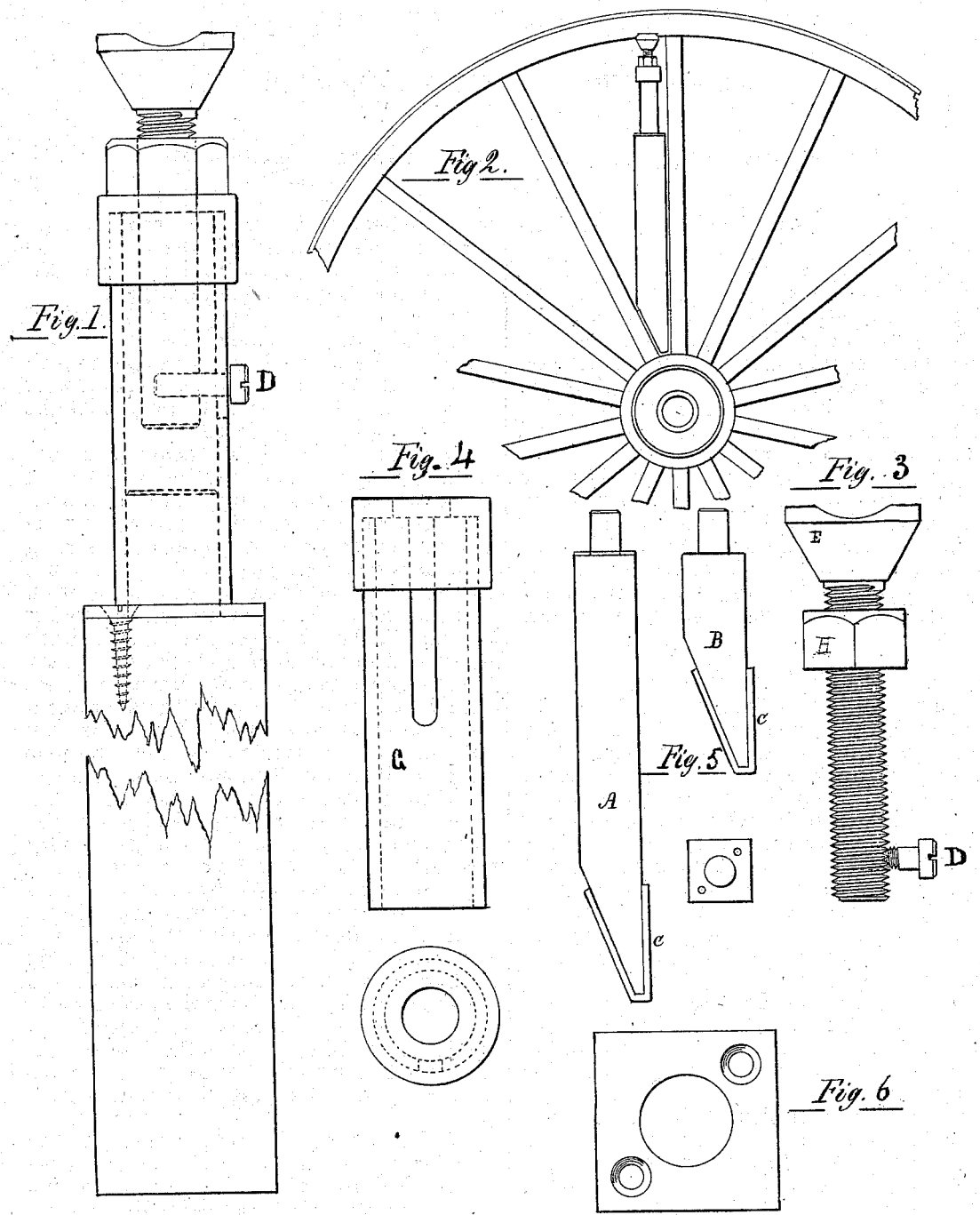

HORACE HOLLISTER DAY, OF NEW YORK, N. Y.

IMPROVEMENT IN TIRE-TIGHTENERS.

Specification forming part of Letters Patent No. 130,024, dated July 30, 1872.

Specification describing an Improved Wagon or Carriage Tire Tightener.

*To whom it may concern:*

Be it known that I, HORACE HOLLISTER DAY, of the city of New York, in the State of New York, have invented a new and useful improvement in tightening tires and spokes of wagons and all kinds of wheels which are made by the use of metal tires upon wooden fellies or rims; and the following is a full and exact description thereof.

The nature of my invention consists in a peculiar method of applying a screw and wedge between the hub and the rim of the wheel to expand the rim for the insertion of a washer, preferably of leather, between the shoulder of the spoke and the wooden rim of the wheel to tighten the spokes, the rim, and the tire.

General Description.

Figure 1 represent the entire machine or device ready to be applied to the wheel when the parts are together. Fig. 2 represents the same as Fig. 1, and shows it in place ready for use. Fig. 3 represents the screw-bolt, with its head E to clasp the felly, and its revolving nut, together with the small guide-screw D to keep the screw-bolt from turning when moved up and down by the revolving nut. Fig. 4 represents the metal case and cap to hold the screw-bolt in its place and guide it up and down, and the socket G, into which the leg of the wedge is inserted. Fig. 5 represents the wooden leg and wedge to support the case and screw-bolt in place and wedge the spoke to the hub. Fig. 6 represents a metal washer or plate on the shoulder of the wooden leg and wedge.

The general operation of this device is to hold the spoke from drawing out of the hub by means of the wedge, which presses equally upon two spokes at points near the hub, and laterally upon both spokes at the same instant that the screw is raising the rim from its resting place on the shoulder of the spoke, and to hold the spoke in place in the hub until the washer is inserted around the tenon between the shoulder of the spoke and the rim of the wheel.

The screw does not revolve in my device, but is lifted by turning the nut which rests upon the head of the case, and it expands the rim and holds it out against the tire until the washer is placed in the recess between the rim and the shoulder of the spoke.

It will be observed that one of the primal causes of tires becoming loose on wagon-wheels is the embedding of the spoke-shoulders into the rim and hub by constant wear when in use; the wood falls away from the tire, leaving the latter loose.

By means of the device above described the rim is set back upon the tire, where it was when the wheel was new, and secured there To effect this the rim is expanded by the screw, and secured in place by inserting washers which rest upon the shoulders of the spokes, and fit into and fill the recesses worn into the rim. The spokes are practically lengthened the extent of the wear, and the recess in the rim is filled up to the like extent, so that by the same operation the rim is set solidly back upon the tire, filling its entire circle as fully as when made; the spokes are also tightened in their places and the whole wheel made firm without altering the original set of the spokes or removing the tire.

To tighten tires by this device, and at the same time true the wheel, it is only necessary to swing the wheel clear from the ground, turn it round near a fixed object to find the places where it is depressed from true circle; at the point of greatest depression the screw and wedge should be applied and operated by turning the nut until this part of the wheel is expanded to its proper dimension, and a washer of corresponding thickness inserted. A few turns of the wheel and the insertion at each point of a washer of the proper thickness is all that is necessary to make a good job.

I find advantage in using more than one machine at the same time upon the same wheel. The cost of each machine is trifling, and a more perfect job can be made by using two or three machines to tighten each wheel, for thereby the work of restoring the wheel to a perfect circle is more conveniently and rapidly done.

Care should be taken to insert between the spokes near the hub and around the wedge thick leather or other pliant material to keep the paint and varnish from injury by the direct and lateral pressure of the wedge. This leather will cover the sides of the wedge and the bottom end as well. This wedge may be made of any hard wood or other hard substance. I prefer oak or hickory wood, while the metal portion should be made of wrought-iron or steel to prevent breaking if carelessly thrown down.

Among the advantages of my invention may be noted the simplicity and cheapness of the device, and the great economy of time in operating it.

In place of the slot in the case and the guide-screw D I sometimes make my case square, and make a corresponding square foot on the screw-bolt, Fig. 3, to keep it from turning in the case.

What I claim is—

1. The combination of the screw-bolt I and nut H with the metal case G, substantially as set forth.

2. The wedge B and screw I, operating together, substantially as set forth, to hold the spokes in place while expanding the rim to tighten wagon tires and spokes.

3. In a tire-tightener, the screw, when used without turning it, to expand the rims of wagon-wheels by turning the nut, substantially as described, and shown in the drawing herewith.

4. The clamp to hold the machine in contact with the rim of the wheel, when attached to and forming part of the non-revolving screw, for the purpose of tightening wagon-tires, as set forth.

5. The combination of the wedge, the screw, and washer, when used in the manner and for the purpose set forth.

HORACE H. DAY.

Witnesses:
   CHAS. SEARS,
   ANN B. PALMER,
   ROBERT PALMER.